(12) United States Patent
Klimov et al.

(10) Patent No.: US 7,723,394 B2
(45) Date of Patent: May 25, 2010

(54) NANOCRYSTAL/SOL-GEL NANOCOMPOSITES

(75) Inventors: Victor L. Klimov, Los Alamos, NM (US); Melissa A. Petruska, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1117 days.

(21) Appl. No.: 10/715,733

(22) Filed: Nov. 17, 2003

(65) Prior Publication Data

US 2005/0107478 A1 May 19, 2005

(51) Int. Cl.
*C08J 7/00* (2006.01)
*C08J 7/16* (2006.01)
(52) U.S. Cl. .......................... 516/98; 516/100; 977/773
(58) Field of Classification Search .................. 516/98, 516/100
See application file for complete search history.

(56) References Cited

U.S. PATENT DOCUMENTS 6,106,609 A * 8/2000 Yang et al. ..................... 117/11
2002/0110180 A1* 8/2002 Barney et al. ............... 374/161
2002/0155507 A1* 10/2002 Bruchez et al. .............. 435/7.2

OTHER PUBLICATIONS

Jacoby, Mitch, Optical Materials: Tunable IR Lasers from Quantum Dots, Chemical & Engineering News, vol. 81, No. 48, pp. 7, Dec. 1, 2003.*
Borman, Stu, Chemical Highlights 2003, Chemical & Engineering News, vol. 81, No. 51, pp. 39-50, Dec. 22, 2003.*
Schaller, R. D., et al. Tunable Near-Infrared Optical Gain and Amplified Spontaneous Emission Using PbSe Nanocrystals, J. Phys. Chem. B, 2003, 107, 13765-13768.*

* cited by examiner

*Primary Examiner*—T. J. Kugel
(74) *Attorney, Agent, or Firm*—Bruce H. Cottrell; Samuel L. Borkowsky

(57) ABSTRACT

The present invention is directed to a process for preparing a solid composite having colloidal nanocrystals dispersed within a sol-gel matrix, the process including admixing colloidal nanocrystals with an amphiphilic polymer including hydrophilic groups selected from the group consisting of —COOH, —OH, —SO$_3$H, —NH$_2$, and —PO$_3$H$_2$ within a solvent to form an alcohol-soluble colloidal nanocrystal-polymer complex, admixing the alcohol-soluble colloidal nanocrystal-polymer complex and a sol-gel precursor material, and, forming the solid composite from the admixture. The present invention is also directed to the resultant solid composites and to the alcohol-soluble colloidal nanocrystal-polymer complexes.

23 Claims, 3 Drawing Sheets

NANOCRYSTAL/SOL-GEL NANOCOMPOSITES

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates to nanocrystal/sol-gel composites and to processes of forming such nanocrystal/sol-gel composites. Additionally, the present invention relates to alcohol-soluble colloidal nanocrystal-polymer complexes of colloidal nanocrystals and an amphiphilic polymer.

BACKGROUND OF THE INVENTION

Semiconductor nanocrystals (NCs), often referred to as nanocrystal quantum dots (NQDs), are of interest for their size-tunable optical and electronic properties. Intermediate between the discrete nature of molecular clusters and the collective behavior of the bulk, NQDs are unique building blocks for the bottom-up assembly of complex functional structures. NQDs can be conveniently synthesized using colloidal chemical routes such as solution-based organometallic synthesis approaches described by C. Murray et al., J. Am. Chem. Soc., 115, 8706 (1993) or by Peng et al., J. Am. Chem. Soc., 123, 183 (2001), such references incorporated herein by reference. Generally, these procedures involve an organometallic approach. Typically these chemical routes yield highly crystalline, monodisperse samples of NQDs. Because of their small dimensions (sub-10 nm) and chemical flexibility, colloidal NQDs can be viewed as tunable "artificial" atoms and as such can be manipulated into larger assemblies engineered for specific applications.

A significant challenge for obtaining stable optical properties and realizing optical applications of quantum dots is to incorporate the NQDs into a suitable transparent host matrix. Early attempts involved the direct growth of the nanoparticles within glassy matrices; however, the resulting materials were plagued by poorly controlled surface passivation, low filling factors, and large size dispersities.

More recently, researchers have sought to decouple the synthesis of the nanoparticles from the fabrication of the composites. Selvan et al., Adv. Mater. v. 13, pp. 985-988 (2001) describe octylamine-passivated semiconductor quantum dots transferred into butanol prior to sol-gel processing with resultant volume fractions or loadings of only up to about 0.1 percent. Sundar et al., Adv. Mater., v. 14, pp. 739-742 (2002), describe incorporation of NCs wherein the surface-passivating ligands are replaced with tris(hydroxylpropyl) phosphine to stabilize the NCs in polar solvents such as ethanol and to provide hydroxyl groups which can be reacted into a titania sol-gel matrix. Volume fractions or loadings of as high as 10 to 12 percent were reported.

Despite the gradual progress, problems have remained. For example, the ligand exchange process used during fabrication of colloidal nanocrystal/sol-gel composites inevitably leads to a reduction in the photoluminescence quantum yields (PL QYs) of the colloidal nanocrystals. In addition, capping groups have varying affinities for different NQD compositions and shapes, requiring a careful selection of ligand each time these parameters are changed. After long and careful research, a different approach has now been developed for the preparation of colloidal nanocrystal-containing composites.

It is an object of the present invention to provide a new process for preparing solid composites including colloidal nanocrystals and to provide the solid composites from such a process.

It is another object of the present invention to form solid composites with high volume loadings of the colloidal nanocrystals.

Still another object of the present invention is solid composites including colloidal nanocrystals where the solid composites are characterized by high refractive indices.

Still another object of the present invention is the preparation of alcohol-soluble colloidal nanocrystals.

SUMMARY OF THE INVENTION

In accordance with the purposes of the present invention, as embodied and broadly described herein, the present invention provides a process for preparing a solid composite including colloidal nanocrystals dispersed within a sol-gel host matrix, the process including admixing colloidal nanocrystals with an amphiphilic polymer including both hydrophobic and hydrophilic groups within a solvent to form an alcohol-soluble colloidal nanocrystal-polymer complex, admixing the alcohol-soluble colloidal nanocrystal-polymer complex and a sol-gel precursor material, and, forming said solid composite from said admixture. In one specific embodiment, the colloidal nanocrystals are of PbSe, and the sol-gel host matrix is of titania. In one embodiment, the hydrophilic groups are selected from the group consisting of —COOH, —OH, —$SO_3H$, —$NH_2$, and —$PO_3H_2$.

The present invention further provides an alcohol-soluble colloidal nanocrystal-polymer complex including colloidal nanocrystals and an amphiphilic polymer including hydrophilic groups such as —COOH, —OH, —$SO_3H$, —$NH_2$, and —$PO_3H_2$.

The present invention still further provides a solid composite that is the reaction product of: (i) colloidal nanocrystals complexed with an amphiphilic polymer including both hydrophobic and hydrophilic groups, and (ii) a sol-gel precursor material. In one embodiment, the hydrophilic groups are selected from the group consisting of —COOH, —OH, —$SO_3H$, —$NH_2$, and —$PO_3H_2$.

DETAILED DESCRIPTION

Figure 1:
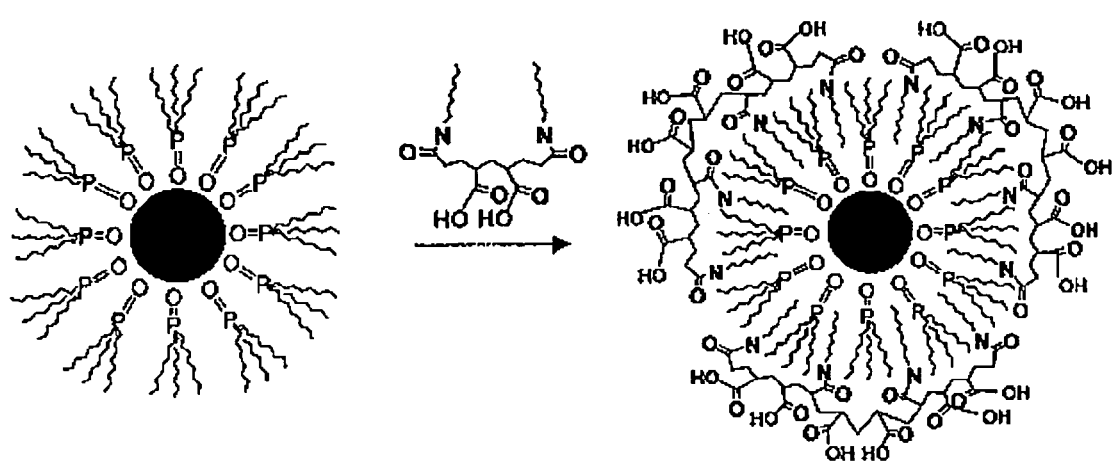
FIG. 1 shows a schematic illustration of the formation of a polymer-colloidal nanocrystals complex showing an idealized micellar polymer shell encapsulating the colloidal nanocrystals.
Figure 2:
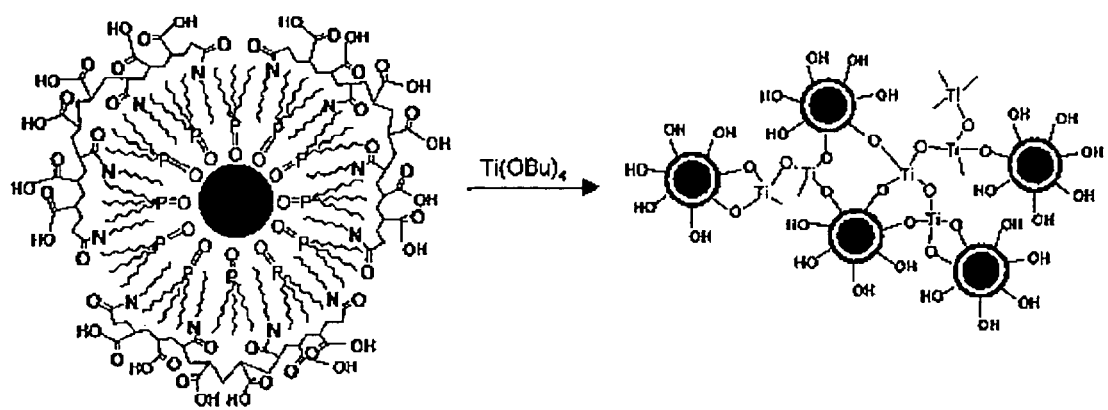
FIG. 2 shows a schematic illustration of the pathway through which polymer-colloidal nanocrystals complexes can become incorporated into a sol-gel matrix.

The present invention is concerned with solid composites including colloidal nanocrystals within a sol-gel host or matrix and with processes of forming such solid composites. The present invention is further concerned with alcohol soluble colloidal nanocrystals useful in the formation of sol-gel based solid composites.

As used herein, the term "nanocrystal" refers to particles less than about 150 Angstroms in the largest axis, preferably from about 10 to about 150 Angstroms. Also, within a particularly selected colloidal nanocrystal, the colloidal nanocrystals are substantially monodisperse, i.e., the particles have substantially identical size and shape.

The colloidal nanocrystals are generally members of a crystalline population having a narrow size distribution. The shape of the colloidal nanocrystals can be a sphere, a rod, a disk and the like. In one embodiment, the colloidal nanocrystals include a core of a binary semiconductor material, e.g., a core of the formula MX, where M can be cadmium, zinc, mercury, aluminum, lead, tin, gallium, indium, thallium, magnesium, calcium, strontium, barium, copper, and mixtures or alloys thereof and X is sulfur, selenium, tellurium, nitrogen, phosphorus, arsenic, antimony, and mixtures or alloys thereof. In another embodiment, the colloidal nanocrystals include a core of a ternary semiconductor material, e.g., a core of the formula $M_1M_2X$, where $M_1$ and $M_2$ can be cadmium, zinc, mercury, aluminum, lead, tin, gallium, indium, thallium, magnesium, calcium, strontium, barium, copper, and mixtures or alloys thereof and X is sulfur, selenium, tellurium, nitrogen, phosphorus, arsenic, antimony, and mixtures or alloys thereof. In another embodiment, the colloidal nanocrystals include a core of a quaternary semiconductor material, e.g., a core of the formula $M_1M_2M_3X$, where $M_1$, $M_2$ and $M_3$ can be cadmium, zinc, mercury, aluminum, lead, tin, gallium, indium, thallium, magnesium, calcium, strontium, barium, copper, and mixtures or alloys thereof and X is sulfur, selenium, tellurium, nitrogen, phosphorus, arsenic, antimony, and mixtures or alloys thereof. In other embodiments, the colloidal nanocrystals include a core of a quaternary semiconductor material, e.g., a core of a formula such as $M_1X_1X_2$, $M_1M_2X_1X_2$, $M_1M_2M_3X_1X_2$, $M_1X_1X_2X_3$, $M_1M_2X_1X_2X_3$ or $M_1M_2M_3X_1X_2X_3$, where $M_1$, $M_2$ and $M_3$ can be cadmium, zinc, mercury, aluminum, lead, tin, gallium, indium, thallium, magnesium, calcium, strontium, barium, copper, and mixtures or alloys thereof and $X_1$, $X_2$ and $X_3$ can be sulfur, selenium, tellurium, nitrogen, phosphorus, arsenic, antimony, and mixtures or alloys thereof. In one embodiment, the colloidal nanocrystals are of silicon or germanium. In some instances, oxides such as zinc oxide (ZnO) and the like may be used as well. Examples include cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), aluminum nitride (AlN), aluminum sulfide (AlS), aluminum phosphide (AlP), aluminum arsenide (AlAs), aluminum antimonide (AlSb), lead sulfide (PbS), lead selenide (PbSe), lead telluride (PbTe), gallium arsenide (GaAs), gallium nitride (GaN), gallium phosphide (GaP), gallium antimonide (GaSb), indium arsenide (InAs), indium nitride (InN), indium phosphide (InP), indium antimonide (InSb), thallium arsenide (TlAs), thallium nitride (TlN), thallium phosphide (TlP), thallium antimonide (TlSb), zinc cadmium selenide (ZnCdSe), indium gallium nitride (InGaN), indium gallium arsenide (InGaAs), indium gallium phosphide (InGaP), aluminum indium nitride (AlInN), indium aluminum phosphide (InAlP), indium aluminum arsenide (InAlAs), aluminum gallium arsenide (AlGaAs), aluminum gallium phosphide (AlGaP), aluminum indium gallium arsenide (AlInGaAs), aluminum indium gallium nitride (AlInGaN) and the like, mixtures of such materials, or any other semiconductor or similar materials. In another embodiment, the colloidal nanocrystals include a core of a metallic material such as gold (Au), silver (Ag), cobalt (Co), iron (Fe), nickel (Ni), copper (Cu), manganese (Mn), alloys thereof and alloy combinations.

Additionally, the core of any semiconductor material or of any metallic material can have an overcoating on the surface of the core. The overcoating can also be a semiconductor material, such an overcoating having a composition different than the composition of the core. The overcoating on the surface of the colloidal nanocrystals can include materials selected from among Group II-VI compounds, Group II-V compounds, Group III-VI compounds, Group III-V compounds, Group IV-VI compounds, Group I-III-VI compounds, Group II-IV-V compounds, and Group II-IV-VI compounds. Examples include cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), aluminum nitride (AlN), aluminum phosphide (AlP), aluminum arsenide (AlAs), aluminum antimonide (AlSb), gallium arsenide (GaAs), gallium nitride (GaN), gallium phosphide (GaP), gallium antimonide (GaSb), indium arsenide (InAs), indium nitride (InN), indium phosphide (InP), indium antimonide (InSb), thallium arsenide (TlAs), thallium nitride (TlN), thallium phosphide (TlP), thallium antimonide (TlSb), lead sulfide (PbS), lead selenide (PbSe), lead telluride (PbTe), zinc cadmium selenide (ZnCdSe), indium gallium nitride (InGaN), indium gallium arsenide (InGaAs), indium gallium phosphide (InGaP), aluminum indium nitride (AlInN), indium aluminum phosphide (InAlP), indium aluminum arsenide (InAlAs), aluminum gallium arsenide (AlGaAs), aluminum gallium phosphide (AlGaP), aluminum indium gallium arsenide (AlInGaAs), aluminum indium gallium nitride (AlInGaN) and the like, mixtures of such materials, or any other semiconductor or similar materials. The overcoating upon the core material can include a single shell or can include multiple shells for selective tuning of the properties. The multiple shells can be of differing materials. The process of the present invention takes advantage of the hydrophobicity of colloidal nanocrystals. An amphiphilic polymer is used to complex the colloidal nanocrystals into a polymeric network as an intermediate product. Thereafter, this intermediate product can allow incorporation of the colloidal nanocrystals into a sol-gel matrix. This process provides a general process suitable for processing and manipulating colloidal nanocrystals without the need for any particular ligand exchange steps. It can be applied to colloidal nanocrystals of a variety of compositions, including PbSe, a near-IR emitter. For this process, the colloidal nanocrystals can include all types of nanocrystals capped with hydrophobic ligands, including, e.g., semiconductor colloidal nanocrystals such as ZnS, ZnSe, ZnTe, CdS, CdSe, CdTe, HgS, HgSe, HgTe, AlN, AlP, AlAs, AlSb, GaN, GaP, GaAs, GaSb, InN, InP, InAs, InSb, TlN, TlP, TlAs, TlSb, PbS, PbSe, PbTe, Si Ge and the like, and metal nanoparticles such as gold (Au), silver (Ag), cobalt (Co), iron (Fe), nickel (Ni), copper (Cu), manganese (Mn) and alloys thereof.

While in some embodiments, the process may yield lower colloidal nanocrystal volume loadings due to the addition of the amphiphilic polymer, the process can yield compositions retaining high photoluminescence quantum yields (PL QYs, defined as the number of photons emitted per number of photons absorbed) of the colloidal nanocrystals. As an example, the QY for CdSe colloidal nanocrystals have been found to fall from about 70% to about 10-15% using a more conventional ligand exchange process such as ligand exchange with an amino-hexanol ligand. In contrast, using the process of the present invention with the use of the amphiphilic polymer, CdSe colloidal nanocrystal-titania composites have been prepared with QYs as high as 40% where in these cases the initial CdSe colloidal nanocrystals only had QYs of from 40 to 60%.

The term "amphiphilic" is meant to refer to a polymer having both a generally hydrophilic or polar (water-soluble) region or end and a generally hydrophobic or non-polar (water-insoluble) region or end. The polymer reacted with the colloidal nanocrystals to modify the hydrophobic surface of the colloidal nanocrystals is an amphiphilic polymer, i.e., a polymer having one or more hydrophobic regions and one or more hydrophilic regions. The amphiphilic polymer may be composed of either a linear or branched polymer, whether naturally occurring, chemically modified, or chemically synthesized. Structurally, polymers are classified as either linear or branched wherein the term "branched" generally means that the individual molecular units (i.e., monomer units) of the branches are discrete from the polymer backbone, and may or may not have the same chemical constitution as the polymer backbone.

The hydrophilic groups of the amphiphilic polymer are groups such as carboxylic acid (—COOH), sulfonic acid (—SO$_3$H), phosphonic acid (—PO$_3$H$_2$), amine (—NH$_2$) or hydroxyl (—OH). Such groups can be provided to the polymer through hydrophilic monomer units including, e.g., water-soluble ethylenically unsaturated $C_3$-$C_6$ carboxylic acids, such as acrylic acid, alkyl acrylic acids (e.g., methacrylic acid), itaconic acid, maleic acid, fumaric acid, acrylamidomethyl-propanesulfonic acid, vinyl sulfonic acid, vinyl phosphonic acid, vinyl-lactic acid, styrene sulfonic acid and the like, allylamine and allylamine salts formed with an inorganic acid, e.g., hydrochloric acid, di-$C_1$-$C_3$-alkylamino-$C_2$-$C_6$-alkyl acrylates and methacrylates such as dimethylaminoethyl acrylate, dimethylaminoethyl methacrylate, diethylaminoethyl acrylate, diethylaminoethyl methacrylate, dimethylaminopropyl acrylate, dimethylaminobutyl acrylate, dimethylaminoneopentyl acrylate, dimethylaminoneopentyl methacrylate, and the like, olefinically unsaturated nitriles, such as acrylonitrile, diolefinically unsaturated monomers, e.g., diallylammonium compounds such as dimethyldiallylammonium chloride, dimethyldiallylammonium bromide, diethyldiallylammonium chloride, methyl-t-butyldiallylammonium methosulfate, methyl-n-propyldiallylammonium chloride, dimethyldiallylammonium hydrogensulfate, dimethyldiallylammonium dihydrogenphosphate, di-n-butyldiallylammonium bromide, diallylpiperidinium bromide, diallylpyrrolidinium chloride, diallylmorpholinium bromide and the like, N-vinylpyrrolidone, N-vinylformamide, acrylamide and substituted acrylamides, such as N-methylolacrylamide and $C_1$-$C_3$ alkyl acrylamides, such as methacrylamide, N-vinylimidazole and N-vinylimidazoline, and other monomers, typically ethylenically unsaturated monomers, such as vinyl monomers, substituted with at least one hydrophilic functionality. The hydrophilic functionalities may be directly bound to a carbon atom in the polymer backbone, or may be bound through a linkage that provides some degree of spacing between the polymer backbone and the hydrophilic functional group. Suitable linkages include, e.g., branched or unbranched alkylenes, branched or unbranched alkenylenes, branched or unbranched heteroalkylenes (typically alkylenes containing one or more ether or —NH— linkages), branched or unbranched heteroalkenylenes (typically alkenylenes containing one or more ether or —NH— linkages), arylenes, heteroarylenes, alkarylenes, aralkylenes, and the like. Such linkages will typically contain 2 to 24, more typically 2 to 12, carbon atoms.

The hydrophilic regions may also be partially or fully hydrolyzed poly(vinyl alcohol), poly(ethylene glycol), poly (ethylene oxide), highly hydrated poly(alkylene oxides) such as poly(ethylene oxide), cellulosic segments (e.g., comprised of cellulose or cellulose derivatives such as hydroxypropyl cellulose, hydroxyethyl cellulose, hydroxypropyl methyl cellulose, methyl cellulose, ethyl cellulose, cellulose acetate, and the like), and polysaccharides such as chitosan or dextran.

The hydrophobic regions of the amphiphilic polymer are groups of at least one non-ionizable, nonpolar monomer unit, facilitating noncovalent association with the hydrophobic surface of the colloidal nanocrystal. Examples of such monomer units include, e.g., acrylates such as methacrylate, methyl methacrylate, ethyl methacrylate, butyl methacrylate, isobutyl methacrylate, hexyl methacrylate, isodecyl methacrylate, lauryl methacrylate, phenyl methacrylate, isopropyl acrylate, isobutyl acrylate and octadecylacrylate, alkylenes such as ethylene and propylene, $C_4$-$C_{12}$-alkyl-substituted ethyleneimine, alkyl acrylamides wherein the alkyl group is larger than lower alkyl (particularly alkyl acrylamides wherein the alkyl group has six or more carbon atoms, typically six to twelve carbon atoms, such as hexylacrylamide, octylacrylamide, and the like), styrene and hydrophobically derivatized styrenes (i.e., styrene substituted with one or more hydrophobic substituents, e.g., $C_5$-$C_{12}$ hydrocarbyl groups), vinyl ether, vinyl esters such as vinyl acetate, and vinyl halides such as vinyl chloride.

The hydrophobic regions may also be polychloroprene, polybutadiene, polysiloxane, polydimethylsiloxane, polyisobutylene or polyurethane blocks.

Particularly preferred amphiphilic polymers include acrylic acid and methacrylic acid polymers modified to include hydrophobic regions, as well as copolymers of acrylic acid and/or methacrylic acid with hydrophobic comonomers such as alkyl acrylamides. Examples of such polymers are poly(acrylic acid-co-octylacrylamide), poly(acrylic acid-co-hexylacrylamide), poly(methacrylic acid-co-octylacrylamide), and poly(methacrylic acid-co-hexylacrylamide), with poly(acrylic acid-co-octylacrylamide) most preferred. The specific methodology used to synthesize polymers suitable as the amphiphilic polymer will depend on the particular monomer types that are employed. As will be appreciated by those of ordinary skill in the art, suitable polymerization techniques include step polymerization, radical chain polymerization, emulsion polymerization, ionic chain polymerization, chain copolymerization, ring-opening polymerization, living polymerization, polycondensation reactions, and graft polymerization.

The amphiphilic polymer can include a hydrophilic backbone that has been modified to contain hydrophobic anchoring groups, i.e., hydrophobic side chains that serve to "anchor" the polymer to the colloidal nanocrystal. For example, hydrophilic polymers containing pendant carboxylic acid groups (e.g., as in poly(acrylic acid), [—(CH$_2$CH(CO$_2$H)]$_n$) can be readily modified to contain a controlled number of branched or unbranched hydrophobic side chains using methods known in the art. In one such method, the pendant carboxylic acid groups of poly(acrylic acid) can be activated with a suitable activating agent, e.g., thionyl chloride or a carbodiimide, followed by reaction with a long chain alkylamine, e.g., a $C_4$-$C_{12}$ alkylamine such as octylamine, and finally with a hydrolyzing agent such as water. Depending on the relative quantities of the alkylamine and the hydrolyzing agent, the resulting polymer is an amphiphilic polymer with a hydrophilic backbone (by virtue of the carboxylic acid groups present after partial hydrolysis) and hydrophobic side chains (the long chain alkyl group attached to the backbone through an amide linkage).

The amphiphilic polymer generally although not necessarily has a molecular weight in the range of approximately 500 to 50,000, preferably in the range of approximately 1000 to 10,000, more preferably in the range of approximately 1000 to 5000.

Hydrophilic polymeric blocks can be homopolymer blocks or copolymer blocks including hydrophilic units (deriving from hydrophilic monomers or from units that are reacted to become hydrophilic). Hydrophobic polymeric blocks can be homopolymer blocks or copolymer blocks including hydrophobic units (obtained with hydrophobic monomers). Hydrophobic blocks optionally include some hydrophilic units, but most of the units are hydrophobic.

In one embodiment, a neutralized octylamine-modified poly(acrylic acid) was used to encapsulate the colloidal nanocrystals. The colloidal nanocrystals were mixed with 40% octylamine-modified poly(acrylic acid) prepared using synthetic procedures described by Wang et al., Polymer Bull., v. 20, 577 (1998) and Sheehan et al., J. Am. Chem. Soc. v. 77, 1067 (1955). The resulting particles of a colloidal nanocrystal-polymer adduct or complex were found soluble in alcohol. In some instances where minor amounts of colloidal nanocrystal-polymer adduct or complex remained un-dissolved in the alcohol, a co-solvent such as tetrahydrofuran and the like could be used with the alcohol to completely or nearly completely solubilize the adduct or complex. The solution could then be mixed with a sol-gel precursor solution, e.g., a titania sol precursor material, and formed into a solid composite such as a film on a substrate. The carboxylic acid groups served as reactive sites for incorporation of the colloidal nanocrystals into the sol-gel matrix. Once incorporated into the sol-gel matrix, the colloidal nanocrystals are highly stable and are not then soluble within hydrocarbon solvents such as hexane.

The alcohols, used with the alcohol soluble colloidal nanocrystal-polymer adduct or complexes in the present invention, generally include ethanol, 1-propanol and 1-butanol. Other alcohols may be used as well, but alcohols having lower boiling points are preferred for improved processability with sol-gel precursors. Also, minor amounts of a co-solvent such as tetrahydrofuran can be used.

Figures 3A, 3B:
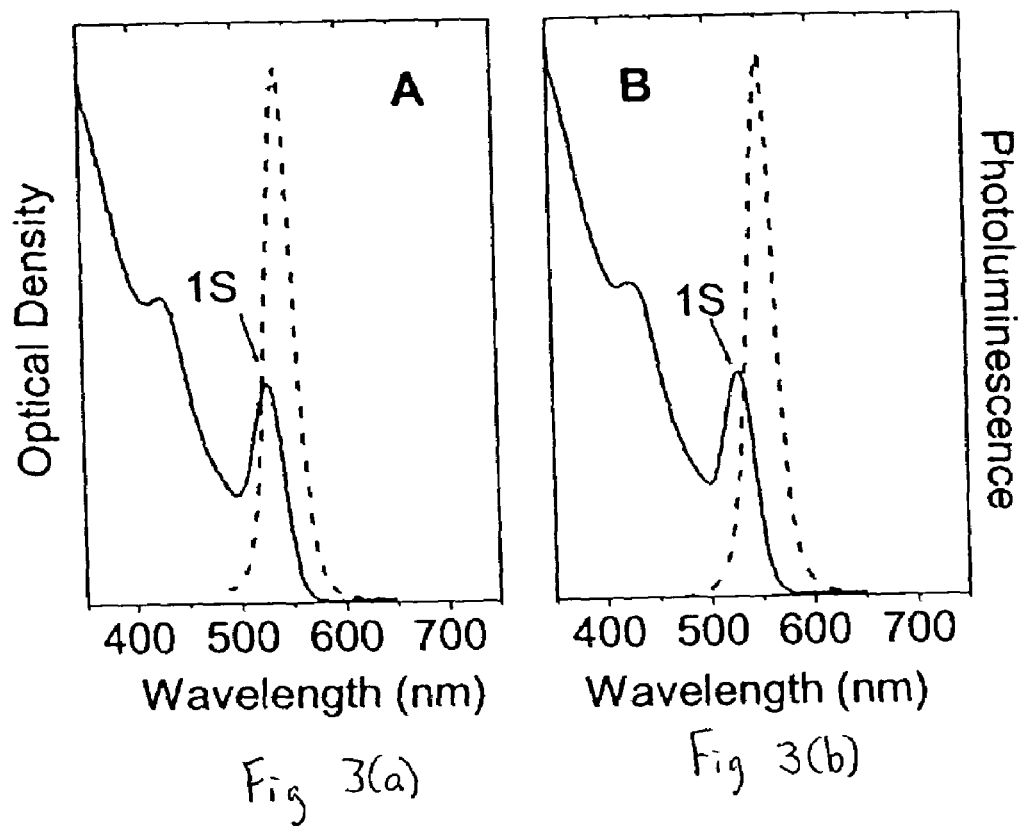
FIGS. 3(a) and 3(b) show plots of absorption spectra of colloidal nanocrystals both before and after incorporation into a sol-gel film.

With the process of the present invention, the colloidal nanocrystals can be incorporated into the sol-gel matrix without affecting the size dispersity of the colloidal nanocrystals. This can be seen in the data of FIG. 3(a) and 3(b). Also, where the solid composite are films formed in the present process, such films are highly smooth with an average surface roughness of less than 6 nm root mean square (RMS).

Again, while not wishing to be bound by the present explanation, as the process of the present invention does not involve a ligand exchange step to create the alcohol-soluble colloidal nanocrystals and relies instead on non-covalent hydrophobic interactions between, e.g., the alkylamine tail of the modified amphiphilic polymer and alkyl groups from a passivating layer such as TOPO, the colloidal nanocrystals can be stabilized in alcohol and in a sol-gel matrix in some instances without any significant decrease in QY. For CdSe/ZnS core-shell colloidal nanocrystals capped with octanethiol or with TOPO/TOP, the QYs for a resultant solid composite are typically from 65 to 100 percent of the initial value observed for solutions of the colloidal nanocrystals in hexane. Where the colloidal nanocrystals do not involve an inorganic shell, a larger decrease in QY has been observed for TOPO/TOP-capped nanoparticles.

The present route has significantly simplified the fabrication of a variety of colloidal nanocrystal-containing sol-gel composites, i.e., the solid composites presently described.

Again, while not wishing to be bound by the present explanation, there may be some displacement of the capping ligands by carboxylic acid groups (COOH) on the polymer. Also, as the amphiphilic polymer is not cross linked about the nanocrystals, it may be that capping ligands could be lost in polar solutions leading to a decrease in QY. Accordingly, in some instances, it may be desirable to cross link the amphiphilic polymer around the nanocrystals before incorporation into the sol-gel matrix to maintain higher QYs. Optionally, an amphiphilic polymer may be chosen that would not bind to the surface of the nanocrystal.

Sol-gel processes generally refer to the preparation of a ceramic material by preparation of a sol, gelation of the sol and removal of the solvent. Sol-gel processes are advantageous because they are relatively low-cost procedures and are capable of coating long lengths or irregularly shaped substrates. In forming the sol-gel based solution used in the processes of the present invention, suitable sol-gel precursor materials are mixed with the other components.

Sol-gel processes can be carried out as described by Brinker et al, "Sol-Gel Science, The Physics and Chemistry of Sol-Gel Processing", Academic Press, 1990. Among suitable sol-gel precursor materials are included metal alkoxide compounds, metal halide compounds, metal hydroxide compounds, combinations thereof and the like where the metal is a cation from the group of silicon, titanium, zirconium, and aluminum. Other metal cations such as vanadium, iron, chromium, tin, tantalum and cerium may be used as well. Sol solutions can be spin-cast, dip-coated, or sprayed onto substrates in air. Sol solutions can also be cast into desired shapes by filling molds or cavities as well. In some instances, different sol-gel precursor materials may lead to improved results depending upon the particular reactivity of the precursor and upon the composition and shape of the nanocrystal. Among the suitable metal alkoxide compounds can be included titanium tetrabutoxide (titanium(IV) butoxide), titanium tetraethoxide, titanium tetraisopropoxide, zirconium tetraisopropoxide, tetraethylorthosilicate (TEOS). Among suitable halide compounds can be included titanium tetrachloride, silicon tetrachloride, aluminum trichloride and the like.

The sol-gel based solutions generated in the process of the present invention are highly processable. They can be used to form solid composites in the shape of planar films and can be used to mold solid composites of various other shapes and configurations. In the process of the present invention, volume fractions or loadings of the colloidal nanocrystals have been prepared as high as about 15 percent by volume and may be as high as up to about 30 percent by volume, although the presence of the amphiphilic polymer may somewhat limit the volume fraction. Further, the process of the present invention has allowed preparation of solid composites with a refractive index of near 1.9, such refractive index values being tunable.

The present process can provide resultant films that are optically transparent and hard. The colloidal nanocrystals are contained within a stable environment, and the narrow size dispersity of the colloidal nanocrystals within these materials is preserved. For applications requiring high QYs, the present process can be a desirable route.

In another aspect of the present invention, the resultant product of the colloidal nanocrystals and the amphiphilic polymer including hydrophilic groups selected from the group consisting of —COOH, —OH, —SO$_3$H, —NH$_2$, and —PO$_3$H$_2$ can yield an intermediate product of an alcohol-soluble colloidal nanocrystal-polymer complex. Alcohol solubility is needed for compositions that are to be reacted with sol-gel precursors where water soluble compositions would not be efficient. Accordingly, such alcohol-soluble colloidal nanocrystal-polymer complexes can be subsequently incorporated into a sol-gel matrix in forming a solid composite. Such alcohol-soluble colloidal nanocrystal-polymer complexes are stable and can be successfully stored for months until subsequent use.

The method of the present invention serves as a general approach for incorporating a wide variety of hydrophobically capped colloidal nanocrystals of a variety of shapes (spheres, rods or other geometries) and compositions (Group II-VI compounds, Group II-V compounds, Group III-VI compounds, Group III-V compounds, Group IV-VI compounds, and the like) into titania and silica matrices. Other polymer materials can be employed to encapsulate the colloidal nanocrystals, and this procedure can work for many amphiphilic polymers possessing hydrophilic groups suitable for coordinating to titania networks, silica networks, and the like.

The solid composites may also be incorporated as active elements into fiber circuitry for light amplification. Optical amplifiers are key components in long distance telecommunication networks and cable television distribution systems. Solid composites including the colloidal nanocrystals may provide larger fiber bandwidth than presently available with erbium-doped optical fiber amplifiers. By controlling the size distribution of selected colloidal nanocrystals such as PbSe, the spectral width, position and profile of the particles may be tailored to expand the bandwidths. Further, PbSe colloidal nanocrystals can be excited by a variety of different wavelengths, minimizing the costs associated with systems wherein excitation is limited to a single wavelength.

The solid composites may also be useful as phosphor materials for use in, e.g., light emitting diodes and solid state lighting structures. The processability of the sol-gel solutions and the photostability of the resultant solid composites allow for their use as the active medium in optical devices including optical memory devices. These types of solid composites can have application as the active medium in dynamic holography devices used in optical communications and optical information processing. For example, all-optical switching and optical image correlation may be facilitated by solid composites of the present invention. Also, the solid composites can be the active media in solid state lasers.

The present invention is more particularly described in the following examples which are intended as illustrative only, since numerous modifications and variations will be apparent to those skilled in the art.

CdSe and CdSe/ZnS core-shell colloidal nanocrystals were synthesized as previously described by Murray et al., J. Am. Chem. Soc., v. 113, 8706 (1993), by Dabbousi et al., J. Phys. Chem. B, v. 101, 9463 (1997), and by Qu et al., J. Am. Chem. Soc., v. 124, 2049 (2002).

EXAMPLE 1

A polymeric ligand, 40% octylamine-modified poly (acrylic acid), was prepared as described by Wang et al., Polymer Bull., v. 20, 577 (1998). To prepare titania sols, a solution of the polymer in chloroform was mixed with a solution of the colloidal nanocrystals in chloroform, which had been isolated from their growth media by precipitation. The polymer solution was gradually added to the solution of the colloidal nanocrystals. When an appropriate amount of polymer was added, the colloidal nanocrystals became soluble in ethanol. The colloidal nanocrystals were found not soluble in water. The chloroform was evaporated, and the colloidal nanocrystals were taken into an inert atmosphere dry box. Ethanol (and when necessary for complete dissolution a small amount of tetrahydrofuran) was added to the colloidal nanocrystals to solubilize them. Following the addition of titanium(IV) butoxide (1:1 colloidal nanocrystal/titania mass ratio), the solution was allowed to stir for up to two hours at room temperature. The solution was then filtered and spin-coated onto a glass substrate and the films allowed to dry in air overnight.

QY results for the thus formed solid composites showed retention of up to about 80% of the original QY for TOPO/TOP-capped CdSe/ZnS nanocrystals and up to about 50% of the original QY for TOPO/TOP-capped CdSe nanocrystals.

In contrast, QY results were compared for blank runs, i.e., runs in which the amphiphilic polymer was not present. In those instances, the colloidal nanocrystals were not soluble in ethanol, and the sol reaction was run in a 2:1 THF/ethanol mixture. The resulting films were optically clear and transparent. For TOPO/TOP-capped CdSe/ZnS nanocrystals, a drop in QY to 20% of the original value was observed. Similarly, for TOPO/TOP-capped CdSe nanocrystals, a decrease in QY to as little as 5% of the original value was observed. For amine-capped CdSe nanocrystals, a decrease in QY to less than 5% of the original value was observed. These results indicate the importance of having an amphiphilic shell to preserve high QYs.

EXAMPLE 2

The polymeric ligand, 40% octylamine-modified poly (acrylic acid), as in Example 1 was used with PbSe colloidal nanocrystals (prepared in accordance with Wehrenberg et al., J. Phys. Chem. B, vol. 106, pp. 10634-10640 (2002) and Murray et al., IBM J. Res. Dev., vol. 45, no. 1, pp. 47-56 (2001)). To prepare titania sols, a solution of the polymer in chloroform was mixed with a solution of PbSe colloidal nanocrystals in chloroform, which had been isolated from their growth media by precipitation. When an appropriate amount of polymer was added, the colloidal nanocrystals became soluble in ethanol. The chloroform was evaporated, and the colloidal nanocrystals were taken into an inert atmosphere dry box. Ethanol (and when necessary a small amount of tetrahydrofuran) was added to the colloidal nanocrystals to solubilize them. Following the addition of titanium(IV) butoxide (1:1 colloidal nanocrystal/titania mass ratio), the solution was allowed to stir for up to two hours at room temperature. The solution was then filtered and spin-coated onto a glass substrate and the films allowed to dry in air overnight.

The absorption spectrum of the PbSe colloidal nanocrystals after incorporation into the titania matrix was found to maintain the same sharp features as in the original solution, suggesting highly monodisperse PbSe colloidal nanocrystals in the solid composite. Also, combined optical and profilometry measurements have indicated high volume loading or filling factors, about 15 percent. Such values are above the critical density for the development of amplified spontaneous emission (ASE). As PbSe colloidal nanocrystals have emission energies in the near-IR, production of a solid composite with this level of volume loading is viewed as significant. Tunable ASE was obtained.

EXAMPLE 3

The polymeric ligand, 40% octylamine-modified poly (acrylic acid), as in Example 1 was used with InAs colloidal nanocrystals. To prepare titania sols, a solution of the polymer in chloroform was mixed with a solution of InAs colloidal nanocrystals in chloroform, which had been isolated from their growth media by precipitation. When an appropriate amount of polymer was added, the colloidal nanocrystals became soluble in ethanol. The chloroform was evaporated, and the colloidal nanocrystals were taken into an inert atmosphere dry box. Ethanol (and when necessary a small amount of tetrahydrofuran) was added to the colloidal nanocrystals to solubilize them. Following the addition of titanium(IV) butoxide (1:1 colloidal nanocrystal/titania mass ratio), the solution was allowed to stir for up to two hours at room temperature. The solution was then filtered and spin-coated onto a glass substrate and the films allowed to dry in air overnight.

EXAMPLE 4

A solution of THF (0.65 mL), TEOS (0.15 mL), and 0.12 M HCl (0.025 mL) was prepared and filtered through a 0.2 micron syringe filter. The solution was allowed to age for 30 minutes. In the meantime, a solution of 40% octylamine-modified poly(acrylic acid) in chloroform was added slowly to a solution of 40 mg TOPO/TOP-capped CdS/ZnS core-shell nanoparticles in chloroform (which had been isolated from their growth medium by precipitation) until the particles became soluble in ethanol. The amount of polymer added is dependent on the size of the nanoparticles. The solvent was removed from the colloidal nanocrystal/polymer mixture, and the mixture was taken into an inert atmosphere glove box. The aged TEOS/THF/HCl solution (0.2 mL) and 0.15 mL ethanol were added to the colloidal nanocrystal/polymer composite. The solution was allowed to stir at room temperature for 30 minutes. It was then filtered through a 0.2 micron syringe filter and spin-coated onto microscope slides. The QY of the original TOPO/TOP-capped CdSe/ZnS core-shell particles in hexane was 40%. The QY of the sol solution in THF was 35%.

Although the present invention has been described with reference to specific details, it is not intended that such details should be regarded as limitations upon the scope of the invention, except as and to the extent that they are included in the accompanying claims.

What is claimed is:

1. A process of preparing a solid composite including colloidal nanocrystals dispersed within a sol-gel host matrix, the process comprising:
    admixing colloidal nanocrystals with an amphiphilic polymer including both hydrophobic groups and hydrophilic groups within a solvent to form an alcohol-soluble colloidal nanocrystal-polymer complex;
    admixing the alcohol-soluble colloidal nanocrystal-polymer complex and a sol-gel precursor material; and,
    forming said solid composite from said admixture.

2. The process of claim 1 wherein said colloidal nanocrystals are of PbSe.

3. The process of claim 2 wherein said colloidal nanocrystals have a volume loading up to at least about 13 percent by volume within said solid composite.

4. The process of claim 1 wherein said amphiphilic polymer is modified poly(acrylic acid) or modified poly(methacrylic acid), said modified poly(acrylic acid) or modified poly(methacrylic acid) including hydrophobic regions.

5. The process of claim 4 wherein said amphiphilic polymer is an octylamine-modified poly(acrylic acid).

6. The process of claim 1 wherein said colloidal nanocrystals have a volume loading of up to about 30 percent by volume within said solid composite.

7. The process of claim 1 wherein said hydrophilic groups are selected from the group consisting of —COOH, —OH, —$SO_3H$, —$NH_2$, and —$PO_3H_2$.

8. The process of claim 1 wherein said sol-gel precursor material is selected from the group consisting of metal alkoxide compounds, metal halide compounds, and metal hydroxide compounds where the metal is selected from the group consisting of silicon, titanium, zirconium, aluminum, vanadium, iron, tin, tantalum, cerium, and chromium.

9. The process of claim 1 wherein said colloidal nanocrystals are selected from the group consisting of $M_1X_1$, $M_1M_2X_1$, $M_1M_2M_3X_1$, $M_1X_1X_2$, $M_1M_2X_1X_2$, $M_1M_2M_3X_1X_2$, $M_1X_1X_2X_3$, $M_1M_2X_1X_2X_3$, and $M_1M_2M_3X_1X_2X_3$, where $M_1$, $M_2$, and $M_3$ are each selected from the group consisting of Zn, Cd, Hg, Al, Ga, In, Tl, Pb, Sn, Mg, Ca, Sr, Ba, mixtures and alloys thereof and $X_1$, $X_2$, and $X_3$ are each selected from the group consisting of S, Se, Te, As, Sb, N, P, mixtures and alloys thereof, Si, Ge, Au, Ag, Co, Fe, Ni, Cu, Mn and alloys of Au, Ag, Co, Fe, Ni, Cu, Mn or alloy combinations thereof.

10. The process of claim 1 wherein the solid composite including colloidal nanocrystals uniformly dispersed within a sol-gel host matrix is characterized by maintaining a major portion of photoluminescent quantum yield exhibited by the colloidal nanocrystals prior to incorporation into the sol-gel host matrix.

11. The process of claim 1 wherein said sol-gel host is transparent.

12. The process of claim 1 wherein said colloidal nanocrystals are uniformly dispersed within a sol-gel host.

13. A solid composite comprising the reaction product of (i) colloidal nanocrystals complexed with an amphiphilic polymer including both hydrophobic groups and hydrophilic groups and (ii) a sol-gel precursor material.

14. The solid composite of claim 13 wherein said amphiphilic polymer is modified poly(acrylic acid) or modified poly(methacrylic acid), said modified poly(acrylic acid) or modified poly(methacrylic acid) including hydrophobic regions.

15. The solid composite of claim 14 wherein said amphiphilic polymer is an octylamine-modified poly(acrylic acid).

16. The solid composite of claim 13 wherein said colloidal nanocrystals have a volume loading of up to about 30 percent by volume within said solid state composite.

17. The solid composite of claim 13 wherein said hydrophilic groups are selected from the group consisting of —COOH, —OH, —$SO_3H$, —$NH_2$, and —$PO_3H_2$.

18. The solid composite of claim 13 wherein the solid composite is characterized by maintaining a major portion of quantum yield exhibited by the colloidal nanocrystals prior to incorporation into the sol-gel precursor material.

19. The solid composite of claim 13 wherein said colloidal nanocrystals are selected from the group consisting of $M_1X_1$, $M_1M_2X_1$, $M_1M_2M_3X_1$, $M_1X_1X_2$, $M_1M_2X_1X_2$, $M_1M_2M_3X_1X_2$, $M_1X_1X_2X_3$, $M_1M_2X_1X_2X_3$, and $M_1M_2M_3X_1X_2X_3$, where $M_1$, $M_2$, and $M_3$ are each selected from the group consisting of Zn, Cd, Hg, Al, Ga, In, Tl, Pb, Sn, Mg, Ca, Sr, Ba, mixtures and alloys thereof and $X_1$, $X_2$, and $X_3$ are each selected from the group consisting of S, Se, Te, As, Sb, N, P, mixtures and alloys thereof, Si, Ge, Au, Ag, Co, Fe, Ni, Cu, Mn and alloys of Au, Ag, Co, Fe, Ni, Cu, Mn or alloy combinations thereof.

20. The solid composite of claim 13 wherein the colloidal nanocrystals are of PbSe.

21. The solid composite of claim 13 wherein said sol-gel precursor material is selected from the group consisting of metal alkoxide compounds, metal halide compounds, and metal hydroxide compounds where the metal is selected from the group consisting of silicon, titanium, zirconium, aluminum, vanadium, iron, tin, tantalum, cerium, and chromium.

22. The solid composite of claim 13 wherein said sol-gel precursor material is transparent.

23. The solid composite of claim 13 wherein said colloidal nanocrystals are uniformly dispersed within a sol-gel host.

* * * * *